H. Hickman,

Trunk.

No. 91,630.

Patented June 22, 1869.

WITNESSES:
John F. Brooks
J. Armstrong McGrath

INVENTOR:
H. Hickman
per Munn & Co
attorneys

United States Patent Office.

HENRY HICKMAN, OF OMAHA, NEBRASKA.

Letters Patent No. 91,630, dated June 22, 1869.

---

IMPROVEMENT IN TRUNKS.

---

The Schedule referred to in these Letters Patent and making part of the same.

---

*To all whom it may concern:*

Be it known that I, HENRY HICKMAN, of Omaha, in the county of Douglas, and State of Nebraska, have invented a new and useful Improvement in Trunks; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to improve the construction of that class of trunks whose capacity is adapted for adjustment according to the amount of clothing or other articles to be put into it; and It consists in the combination of rubber packing-strips with the main body of the trunk and the exterior sliding portion, as will be hereinafter more fully described.

Figure 1:
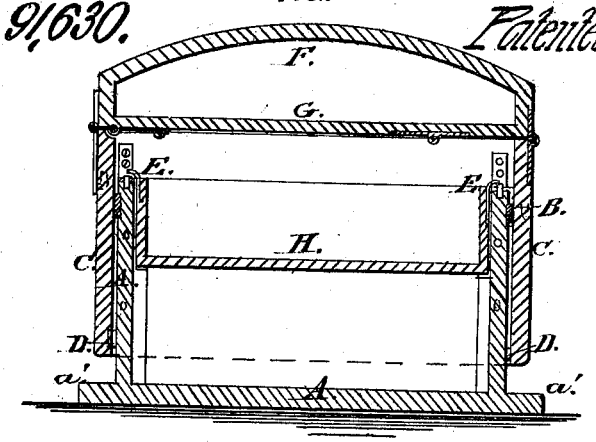
Figure 1 is a vertical cross-section of my improved trunk.
Figure 2:
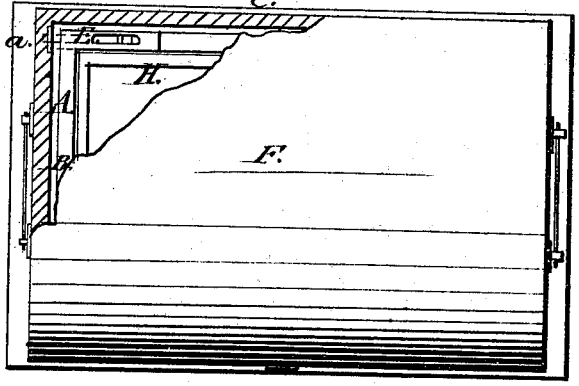
Figure 2 is a top view of the same, part of the lid being broken away to show the construction.

A is the lower or interior part of the body of the trunk, which is made with an outwardly-projecting flange, $a'$, around its bottom or lower edge, as shown in figs. 1 and 2.

B is a rubber strip or packing, extending around and securely attached to the outer surface of the part A, half an inch more or less, from its upper edge.

C is the upper or exterior part of the body of the trunk, which is made of such a size as to fit upon the part A, as shown in figs. 1 and 2.

To the inner surface of the part C, half an inch more or less from its lower edge, is attached a rubber strip or packing, D, as shown in fig. 1.

The rubber strips B and D not only keep water, dust, &c., from finding their way into the trunk between the parts A and C, but they also serve as stops to prevent the said parts from being drawn too far apart.

When the upper part C is pushed fully down upon the part A, the lower edge of the part C rests upon the flange $a'$ of the lower part A.

This construction enables the size of the trunk to be increased or diminished at pleasure, according to the amount of clothing or other articles required to be packed in it.

The parts A and C are secured in position, when adjusted, by means of bolts E attached to the upper edges of the part A at its four corners, and shooting into one or the other of the holes in the inner surface of the part C.

If desired, the parts of the inner surface of the part C in which the bolt-holes are formed, may be faced with metal to guard against wear.

F is the lid, which is constructed and connected with the upper edge of the part C in the ordinary manner, and which may be provided with a till, G, if desired.

The upper part of the inner or lower part A may be provided with a tray, H, in the ordinary manner.

Having thus described my invention,

What I claim as new, and desire to secure by Letters Patent, is—

The rubber packing-strips B D, in combination with the inner part A and the outer part C of the trunk, all arranged as described for the purpose specified.

HENRY HICKMAN.

Witnesses:
WATSON B. SMITH,
R. O. ADAMS.